United States Patent
Marchandise et al.

(10) Patent No.: US 9,003,767 B2
(45) Date of Patent: Apr. 14, 2015

(54) ELECTRIC THRUSTER, A METHOD OF STOPPING AN ELECTRIC ENGINE INCLUDED IN SUCH A THRUSTER, AND A SATELLITE INCLUDING SUCH A THRUSTER

(75) Inventors: Frederic Marchandise, Vernon (FR); Michael Oberg, Port Mort (FR); Gerard Passagot, Vernon (FR)

(73) Assignee: SNECMA, Paris (FR)

( * ) Notice: Subject to any disclaimer, the term of this patent is extended or adjusted under 35 U.S.C. 154(b) by 230 days.

(21) Appl. No.: 13/816,408

(22) PCT Filed: Jul. 27, 2011

(86) PCT No.: PCT/FR2011/051812
§ 371 (c)(1),
(2), (4) Date: Apr. 19, 2013

(87) PCT Pub. No.: WO2012/020190
PCT Pub. Date: Feb. 16, 2012

(65) Prior Publication Data
US 2013/0200219 A1  Aug. 8, 2013

(30) Foreign Application Priority Data
Aug. 12, 2010  (FR) .................................. 10 56577

(51) Int. Cl.
*F03H 1/00* (2006.01)
*B64G 1/40* (2006.01)

(52) U.S. Cl.
CPC .............. *F03H 1/0012* (2013.01); *B64G 1/405* (2013.01); *F03H 1/0018* (2013.01); *F03H 1/0037* (2013.01)

(58) Field of Classification Search
CPC ..... B64G 1/405; F03H 1/0012; F03H 1/0018; F03H 1/0037
USPC ......................................... 60/202, 203.1, 204
See application file for complete search history.

(56) References Cited

U.S. PATENT DOCUMENTS

| 3,988,566 A | * | 10/1976 | Vogts et al. | ............... 315/111.21 |
| 5,339,623 A | | 8/1994 | Smith | |
| 5,819,526 A | * | 10/1998 | Jackson et al. | ............... 60/203.1 |

(Continued)

FOREIGN PATENT DOCUMENTS

WO   2009 037196   3/2009

OTHER PUBLICATIONS

Polk, J., et al., "In-Flight Performance of the NSTAR Ion Propulsion System on the Deep Space One Mission," IEEE, vol. 4, pp. 123-147, (Mar. 18, 2000) XP 10517628.

(Continued)

*Primary Examiner* — Ted Kim
(74) *Attorney, Agent, or Firm* — Oblon, McClelland, Maier & Neustadt, L.L.P.

(57) ABSTRACT

An electric thruster includes at least one electric engine, a feed system for the engine including a high-pressure tank of ionizable gas, a low-pressure buffer tank connected to the high-pressure tank by a valve, and a system of pipes for conveying the gas from the low-pressure buffer tank to an anode and to a cathode of the engine. The low-pressure buffer tank is in open connection with the engine. The thruster detects that a magnitude of the discharge current between the anode and the cathode is less than a threshold value and switches off the discharge voltage as a result of the detection. The thruster can be for use in a satellite.

7 Claims, 5 Drawing Sheets

(56) References Cited

U.S. PATENT DOCUMENTS

| | | |
|---|---|---|
| 6,286,304 B1 | 9/2001 | Back et al. |
| 6,301,876 B1 | 10/2001 | Back et al. |
| 2011/0073713 A1 | 3/2011 | Harmann et al. |

OTHER PUBLICATIONS

International Search Report Issued Nov. 10, 2011 in PCT/FR11/51812 Filed Jul. 27, 2011.

* cited by examiner

ELECTRIC THRUSTER, A METHOD OF STOPPING AN ELECTRIC ENGINE INCLUDED IN SUCH A THRUSTER, AND A SATELLITE INCLUDING SUCH A THRUSTER

BACKGROUND OF THE INVENTION

The present invention lies in the field of electric thrust engines.

It applies in preferred but non-limiting manner to an ion or plasma thrust engine of the type used for delivering electric thrust in space, in particular for use with geostationary telecommunications satellites.

Figure 1:
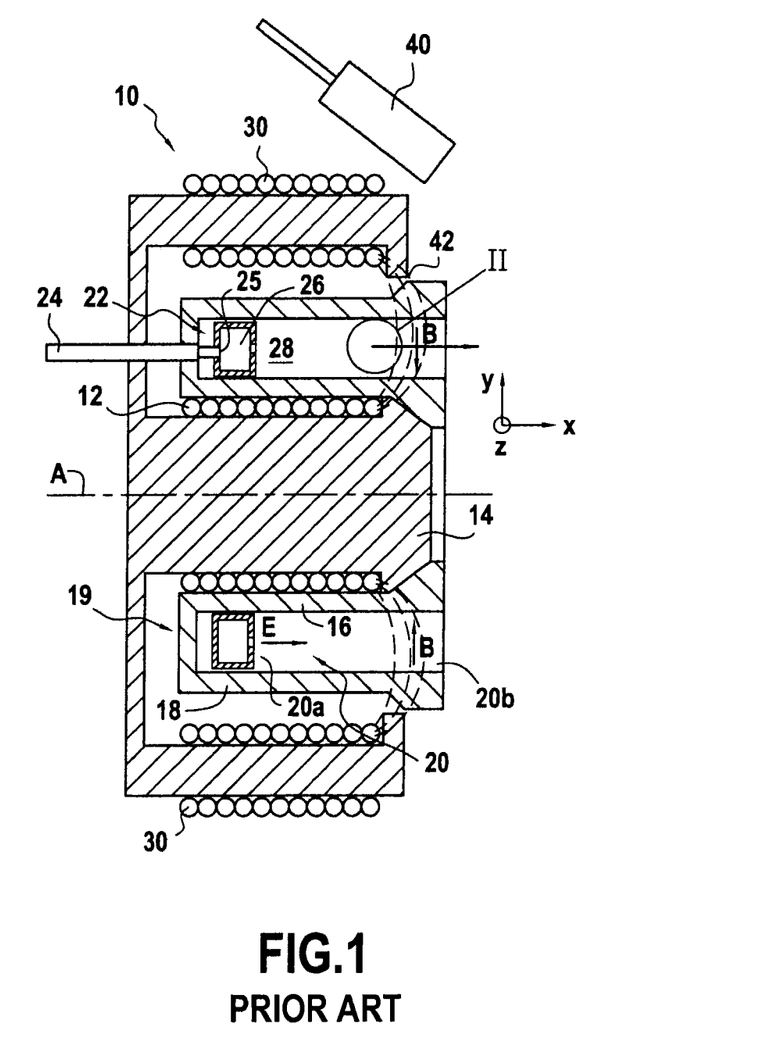
FIG. 1, described above, shows a prior art plasma thruster.

FIG. 1 is a general view of a prior art Hall effect plasma thruster 10. A central magnetic coil 12 surrounds a central core 14 that extends along a main longitudinal axis A. An annular inner wall 16 surrounds the central coil 12. This inner wall 16 is surrounded by an outer annular wall 18, the annular walls 16 and 18 defining an annular discharge channel 20 that extends around the main axis A. In the presently-described example, the inner wall 16 and the outer wall 18 form portions of a single ceramic part 19.

In the description below, the term "inner" designates a portion close to the main axis A and the term "outer" a portion remote from said axis.

Likewise, the terms "upstream" and "downstream" are defined relative to the normal flow direction (from upstream to downstream) of gas through the discharge channel 20.

The upstream end 20a of the discharge channel 20 (on the left in FIG. 1) is closed by an injection system 22 made up of a feed pipe 24 for feeding an ionizable gas (generally xenon), the pipe 24 being connected via a feed hole 25 to an anode 26 serving as a manifold for injecting gas molecules into the discharge channel 20.

The downstream end 20b of the discharge channel 20 is open (on the right in FIG. 1).

A plurality of peripheral magnetic coils 30, each presenting an axis parallel to the main axis A, are arranged all around the outer wall 18. The central magnetic coil 12 and the outer magnetic coils serve to generate a radial magnetic field B of intensity that is at a maximum at the downstream end 20b of the discharge channel 20.

A hollow cathode 40 is arranged outside the peripheral coils 30 so as to be oriented in order to eject electrons in a direction parallel to the main axis A and in the zone situated downstream from the downstream end 20b of the discharge channel 20. A potential difference is established between the cathode 40 and the anode 26.

The electrons as ejected in this way are directed in part into the inside of the discharge channel 20. Under the influence of the magnetic field generated between the cathode 20 and the anode 26, some of these electrons reach the anode 26, while most of them are trapped by the intense magnetic field B in the vicinity of the downstream end 20b of the discharge channel 20.

The gas molecules traveling from upstream to downstream in the discharge channel 20 are ionized by the electrons with which they come into collision.

Furthermore, the electrons present in the discharge channel 20 create an axial electric field E that accelerates the ions between the anode 26 and the downstream outlet 20b of the discharge channel 20 in such a manner that these ions are ejected at high speed from the discharge channel 20, thereby generating the thrust of the engine.

The invention relates more particularly to the feed system of the electric thruster.

In preliminary manner, it should be observed that present thrusters require a low regulated flow of gas in order to obtain thrust that is constant. This flow is created from a tank in association with a pressure regulator that brings the pressure into a constant range, the flow rate then being regulated so as to deliver the necessary quantity of gas to the engine and to the hollow cathode. This regulation is usually performed by a thermocapillary mechanism fed with electricity and by a flow rate restrictor enabling the flow to be shared between the anode and the cathode.

Figure 2:
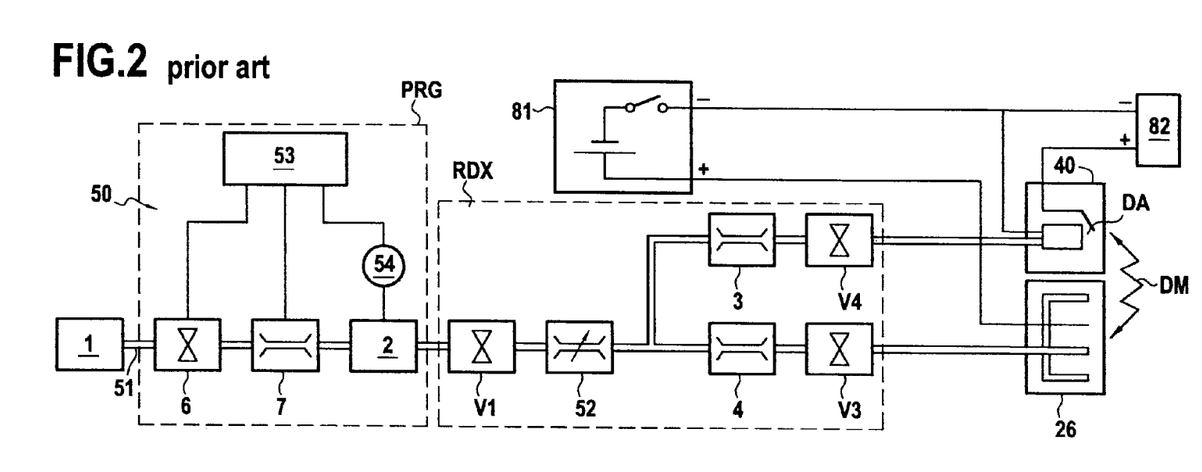
FIG. 2, described above, shows a feed system of the FIG. 1 plasma thruster.

FIG. 2 shows a feed system 50 for the electric thruster 10 in accordance with the prior art.

That feed system 50 comprises a high-pressure tank 1 of ionizable gas, e.g. xenon or krypton, that is connected by a pipe 51 to a low-pressure buffer tank 2.

The volume of the low-pressure buffer tank 2 is about 1 liter (L).

The pressure in the high-pressure tank 1 varies from about 150 bars to about 1 bar; the pressure in the low-pressure buffer tank 2 varies in the range about 1.5 bars to 3 bars.

A restrictor 7 is placed in the pipe 51 to reduce pressure between the high-pressure tank 1 and the low-pressure buffer tank 2.

The pipe 51 also includes a regulator valve 6 for regulating the flow rate of gas between the high-pressure tank 1 and the low-pressure buffer tank 2.

The feed system 50 has means 53 for controlling the opening and closing of the regulator valve 6 and for measuring the pressure in the low-pressure buffer tank 2 in co-operation with a pressure sensor 54.

Downstream from the low-pressure buffer tank 2, the feed system 50 has two stop valves V3 and V4, a redundant stop valve V1, and a thermocapillary mechanism 52 for providing fine adjustment of the flow rate of gas to the anode 26 and to the cathode 40, respectively.

Restrictors 3 and 4 that are respectively associated with the anode 26 and with the cathode 40 serve to share the flow of gas between the cathode and the anode, with about 8% to 10% going to the cathode and about 90% to 92% going to the anode.

The feed system 50 also includes power electronics 81 suitable for applying voltage to the engine and ignition electronics 82 suitable for establishing a discharge current between the anode 26 and the cathode 40. Controlling software serves to sequence ignition of the engine and control of the vales for delivering gas and electricity to the thruster in a determined sequence.

In FIG. 2, discharge ignition as required solely for starting is referenced DA, and established engine discharge between the anode 26 and the cathode 40 is referenced DM.

It should be observed that with a Hall effect plasma engine, the above-mentioned electronics 81, 82 is often remote from the thruster, with a filter unit being used between the engine and the power electronics in order to avoid electromagnetic disturbances.

Usually, the subsystem constituted by the regulator valve 6, the restrictor 7, the low-pressure buffer tank 2, the means 53 for controlling opening and closing of the regulator valve 6, and the pressure sensor 54 constitutes a pressure regulator unit PRG.

Likewise, the stop valve V1, the thermocapillary mechanism 52, the restrictors 3, 4, and the valves V3, V4 constitute a unit RDX for regulating the flow rate of ionizing gas.

The thruster and the ignition system as described above present certain drawbacks.

Figure 3:
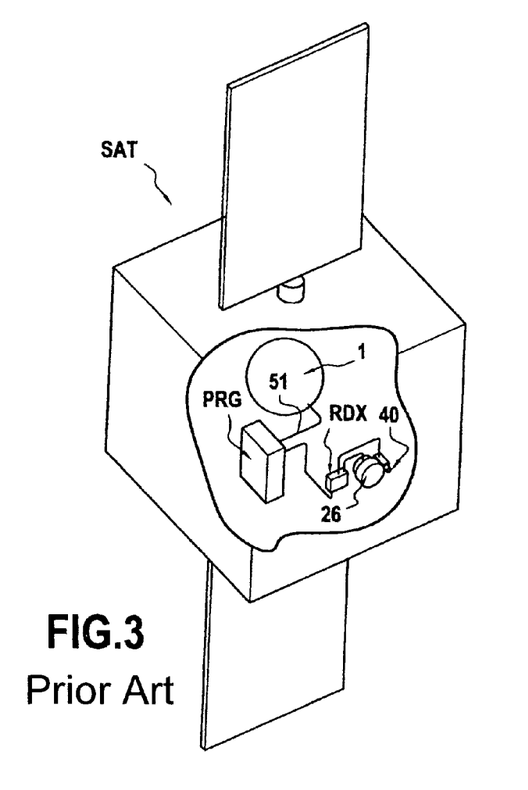
FIG. 3, described above, is a diagram of a prior art satellite.

Firstly, the bulk associated with the volume of the low-pressure buffer tank 2, typically 1 L, requires it to be offset in the satellite, thus needing additional tubular connections in the satellite. This arrangement is shown diagrammatically in FIG. 3 in which a satellite SAT presents a tubular connection between the pressure regulator unit PRG and the unit RDX for regulating the flow rate of ionizing gas.

Secondly, the feed system 50 requires the presence of valves downstream from the buffer tank (valves of the type V1, V3, and V4) in order to avoid losing the gas stored in the low-pressure buffer tank 2 when the engine is stopped, these valves being closed in practice simultaneously or practically simultaneously with the interruption of the supply of power to the engine.

OBJECT AND SUMMARY OF THE INVENTION

The invention proposes an electric thruster that does not present the above-mentioned drawbacks.

More precisely, and in a first aspect, the invention provides an electric thruster comprising:
- at least one electric engine having an anode, a cathode, and a gas manifold; and
- a feed system for the engine, the feed system comprising:
  - a high-pressure tank of ionizable gas;
  - a low-pressure buffer tank connected to the high-pressure tank by means for dropping the pressure of the gas;
  - at least one valve suitable for opening, closing, or regulating the flow rate of gas between the high-pressure tank and the low-pressure buffer tank; and
  - a system of pipes for conveying the gas from the low-pressure buffer tank to the engine; and
- power electronics suitable for delivering or not delivering electric power to said engine by applying or interrupting a discharge voltage between the anode and the cathode.

In accordance with the invention, the low-pressure buffer tank is in open connection with the gas manifold; and the thruster includes means for detecting that the magnitude of the discharge current between the anode and the cathode is less than a threshold value and for interrupting the discharge voltage as a result of making such a detection.

Correspondingly, the invention also provides a method of controlling an electric engine having an anode, a cathode, and a gas manifold, the engine being included in an electric thruster that also comprises:
- a feed system for the engine, the feed system comprising:
  - a high-pressure tank of ionizable gas;
  - a low-pressure buffer tank connected to the high-pressure tank by means for dropping the pressure of said gas, and in open connection with said gas manifold;
  - at least one valve suitable for opening, closing, or regulating the flow rate of gas between the high-pressure tank and the low-pressure buffer tank; and
  - a system of pipes for conveying the gas from the low-pressure buffer tank to the gas manifold; and
- power electronics suitable for delivering or not delivering electric power to said engine by applying or interrupting a discharge voltage between the anode and the cathode.

In accordance with the invention, this method of controlling the engine comprises:
- a step of closing the valve to interrupt the flow of gas between the high-pressure tank and the low-pressure buffer tank;
- a step of detecting a magnitude of the discharge current between the anode and the cathode that is lower than a threshold value; and
- a step of switching off said discharge voltage as a result of making such a detection.

In this document, the terms "anode" and "cathode" should be interpreted as follows:

The term "anode" designates the fluid circuit associated with the anode side of the engine for a plasma thrust engine and the fluid circuit in association with the ionization chamber side of the engine in an ion thrust engine.

The term "cathode" designates the fluid circuit in association with the cathode side of the engine in a plasma thrust engine, and the fluid circuit in association with the cathode of the ionization chamber and the neutralization cathode of the engine in an ion thrust engine.

Thus, and in general, the engine proposes omitting valves downstream from the low-pressure buffer tank, in other words omitting the valves placed between the low-pressure buffer tank and the anode and between the low-pressure buffer tank and the cathode.

The person skilled in the art can thus understand that the term "open connection" means any type of pipework not including a valve or fitted with a valve that is permanently open.

In accordance with the invention, the engine is stopped by closing the valves between the high-pressure tank and the low-pressure buffer tank without interrupting the power electronics. The decreasing flow rate of gas gives rise to a reduction in the magnitude of the discharge current and then, only once said magnitude is less than a threshold, is the power supply switched off.

This mode of operation may be referred to as "blow down" and it prevents losing any gas, since the low-pressure buffer tank is completely emptied before the power supply is switched off. The propulsive fluid is thus used with full efficiency.

In a preferred embodiment, the electric thruster of the invention has a regulator member (typically a valve) between the high-pressure tank and the low-pressure buffer tank, together with means for controlling said member so as to obtain at the outlet from the low-pressure buffer tank a pressure that varies in amplitude by less than 5% around a setpoint pressure. A pressure sensor measures the pressure in the low-pressure buffer tank.

In this embodiment, on starting, the regulator member is open so long as the setpoint pressure is not reached, and then the opening of the regulator member is continuously adjusted so as to tend towards the setpoint pressure in the low-pressure buffer tank.

In a preferred embodiment, the electric thruster of the invention has a restrictor between the high-pressure tank and the low-pressure buffer tank so as to limit the flow to the low-pressure buffer tank. It is then possible to use a low-pressure buffer tank having a capacity that is much smaller than that in known electric thrusters, e.g. less than 20 cubic centimeters ($cm^3$), while maintaining good accuracy in terms of the pressure in the buffer tank, thereby guaranteeing a flow towards the anode and the cathode at a rate that is practically stable.

A low-pressure buffer tank of small volume is most advantageous since it can be incorporated in the engine itself, in compact manner.

Naturally, the flow rate may be adjusted by varying the setpoint pressure.

BRIEF DESCRIPTION OF THE DRAWINGS

Other characteristics of the invention appear in the light of the following description made with reference to the accompanying drawings that show an embodiment having no limiting character, and in which.

DETAILED DESCRIPTION OF AN EMBODIMENT OF THE INVENTION

Figure 4:
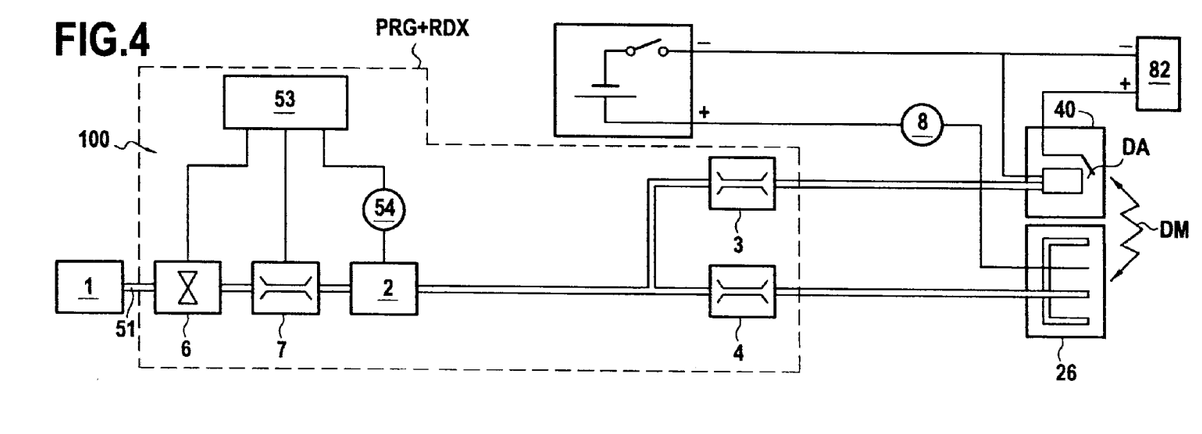
FIG. 4 shows a feed system suitable for use with an electric thruster in accordance with a particular embodiment of the invention.

FIG. 4 shows a feed system 100 suitable for use in an electric thruster in accordance with the invention.

It differs from the feed system 50 of FIG. 2 in particular in that the low-pressure buffer tank 2 is permanently in open connection with the anode 26 and with the cathode 40, the valves V1, V3, and V4 being omitted.

The feed system 100 also includes means 8 for measuring discharge current, which means are placed in series in the circuit constituted by the power electronics 81, the anode 26, and the cathode 40.

In the initial state of the system, the regulator valve 6 is closed; the low-pressure buffer tank 2, and the restrictors 7, 3, and 4 are subjected to a very low residual pressure.

The net volume between the regulator valve 6 and the restrictor 7 is preferably minimized in order to retain good accuracy in terms of the pressure in the buffer tank 2.

By virtue of this characteristic, there is no need to use a thermocapillary mechanism 52 downstream from the low-pressure buffer tank 2.

In order to start the engine, the regulator valve 6 is opened, the ionizable gas being conveyed from the low-pressure buffer tank 2 to the anode 26 and to the cathode 40.

Voltage is applied to the engine by the power electronics 81, and the ignition electronics 82 produce an ignition discharge DA, thereby giving rise in conventional manner to a thrust discharge DM between the anode 26 and the cathode 40.

In the presently-described embodiment, the nominal magnitude of the discharge current between the anode 26 and the cathode 40 is 1 amp (A).

The pressure is measured continuously in the low-pressure buffer tank 2 by the pressure sensor 54 and it is maintained substantially constant (with tolerance of 5% in this example) and equal to a setpoint pressure by controlling the opening of the regulator valve 6.

The flow rate of ionizable gas fed to the engine can be adjusted by varying this setpoint pressure. In the presently-described embodiment, the setpoint pressure may vary over the range 1 bar to 2 bar.

Figure 8:
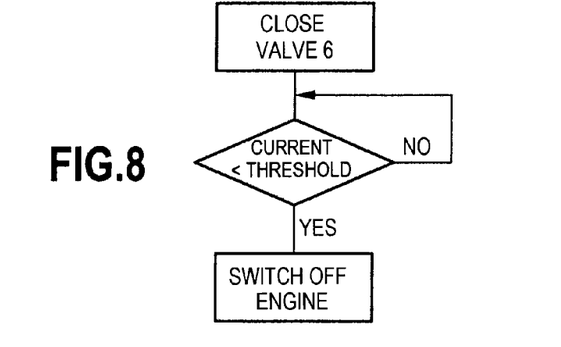
FIG. 8 is a flow chart showing the main steps of a method of stopping an electric engine in accordance with a particular embodiment of the invention.

As shown in FIG. 8, in order to stop the engine, the first step is to close the regulator valve 6, initially without interrupting the power electronics 81. The low-pressure buffer tank 2 then empties progressively, leading to a reduction in the magnitude of the discharge current.

When the magnitude of the discharge current between the anode 26 and the cathode 40 drops below a threshold value, specifically 1 milliamp (mA), the power electronics 81 interrupts the discharge voltage between the anode 26 and the cathode 40.

Figure 5:
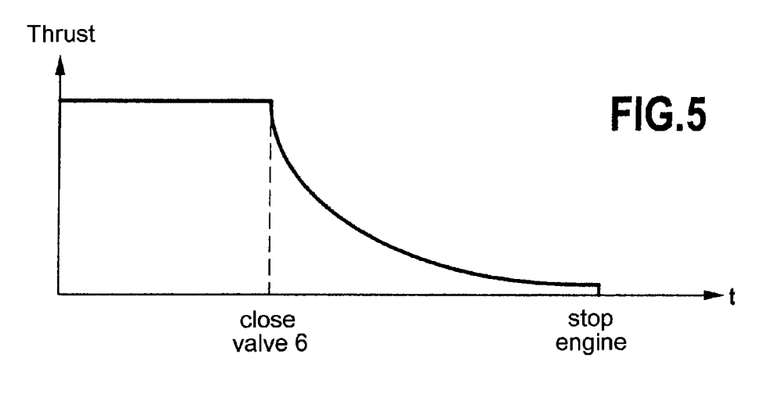
FIG. 5 is a graph showing the variation of thrust from a plasma thruster fed with a system in accordance with that shown in FIG. 4.

This leads to a progressive reduction in the thrust from the thruster as the low-pressure buffer tank 2 empties out, with this being known as "blow down".

Figure 6:
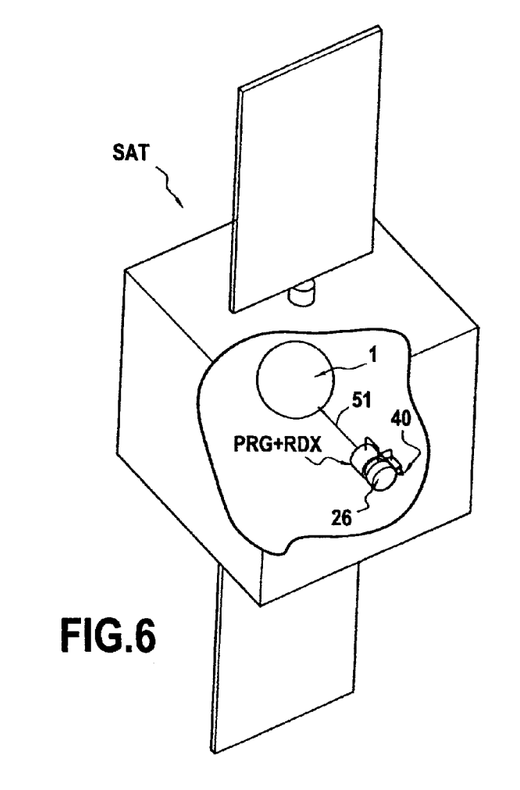
FIG. 6 is a diagram of a satellite in accordance with the invention.

Most advantageously, the volume of the low-pressure buffer tank 2 in this example is about 20 cubic centimeters ($cm^3$), such that the tank can be incorporated compactly in a satellite SAT in accordance with the invention, as shown in FIG. 6, with it being possible for the pressure regulator unit PRG and the flow rate regulator unit RDX to be incorporated therein.

Figure 7:
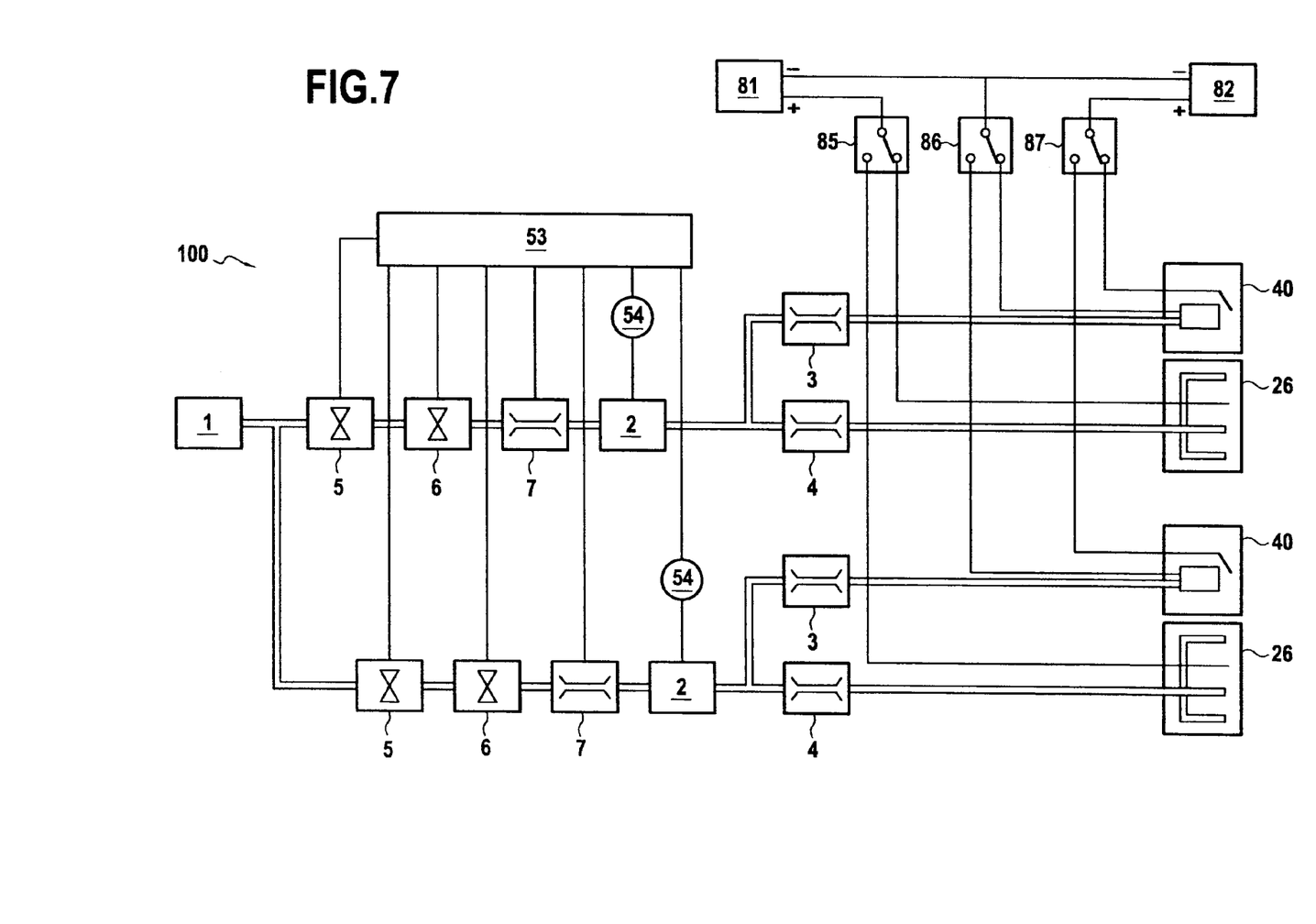
FIG. 7 shows a feed system suitable for use in an electric thruster having two engines and in accordance with another particular embodiment of the invention.

FIG. 7 shows an embodiment of the invention in an electric propulsion system having two engines. In this embodiment the thruster has two valves 5 at the outlet from the high-pressure tank 1, thereby enabling one engine to be stopped by stopping the flow of ionizable gas to the low pressure buffer tank of that engine.

In the presently-described embodiment, switches 85, 86, and 87 make it possible to establish an ignition discharge DA and a thrust discharge DM for one engine or the other.

The invention claimed is:

1. An electric thruster comprising:
   at least one electric engine including an anode, a cathode, and a gas manifold;
   a feed system for the engine, the feed system comprising:
   a high-pressure tank of ionizable gas;
   a low-pressure buffer tank connected to the high-pressure tank by a means for dropping a pressure of the gas;
   at least one valve configured to open, close, or regulate a flow rate of gas between the high-pressure tank and the low-pressure buffer tank; and
   a system of pipes for conveying the gas from the low-pressure buffer tank to the gas manifold of the engine; and
   power electronics configured to deliver or not deliver electric power to the engine by applying or interrupting a discharge voltage between the anode and the cathode;
   wherein the low-pressure buffer tank is in open connection with the gas manifold and with the anode and with the cathode; and
   further comprising means for detecting that a magnitude of the discharge current between the anode and the cathode is less than a threshold value and for interrupting the discharge voltage as a result of making the detection.

2. An electric thruster according to claim 1, wherein the threshold value is about 1 mA for an engine when a nominal value of the magnitude of the discharge current is about 1 A.

3. An electric thruster according to claim 1, further comprising a restrictor between the high-pressure tank and the low-pressure buffer tank, and wherein the low-pressure buffer tank has a capacity of less than 20 $cm^3$.

4. An electric thruster according to claim 1, further comprising a regulator member between the high-pressure tank and the low-pressure buffer tank, together with means for controlling the regulator member so as to obtain at an outlet from the low-pressure buffer tank a pressure that varies in amplitude by less than 5% around a setpoint pressure.

5. An electric thruster according to claim 4, wherein a mean value of the pressure is in a range of 0.1 bars to 10 bars.

6. A satellite comprising an electric thruster according to claim 1.

7. A method of controlling an electric engine including an anode, a cathode, and a gas manifold, the engine being included in an electric thruster that includes:
   a feed system for the engine, the feed system including:

a high-pressure tank of ionizable gas;

a low-pressure buffer tank connected to the high-pressure tank by means for dropping a pressure of the gas, and in open connection with the engine;

at least one valve configured to open, close, or regulate a flow rate of gas between the high-pressure tank and the low-pressure buffer tank; and a system of pipes for conveying the gas from the low-pressure buffer tank to the gas manifold; and power electronics configured to deliver or not deliver electric power to the engine by applying or interrupting a discharge voltage between the anode and the cathode;

the method comprising, with the low-pressure buffer tank being in open connection with the anode and with the cathode:

closing the valve to interrupt the flow of gas between the high-pressure tank and the low-pressure buffer tank;

detecting a magnitude of the discharge current between the anode and the cathode that is lower than a threshold value; and switching off the discharge voltage as a result of making the detection.

\* \* \* \* \*